US011734327B2

(12) United States Patent
Bastide et al.

(10) Patent No.: US 11,734,327 B2
(45) Date of Patent: Aug. 22, 2023

(54) CONTENT ANALYSIS AND CONTEXT SUMMARY GENERATION

(71) Applicant: INTERNATIONAL BUSINESS MACHINES CORPORATION, Armonk, NY (US)

(72) Inventors: Paul R. Bastide, Ashland, MA (US); Robert E. Loredo, North Miami Beach, FL (US); Liam S. Harpur, Dublin (IE); Matthew E. Broomhall, Goffstown, NH (US)

(73) Assignee: International Business Machines Corporation, Armonk, NY (US)

( * ) Notice: Subject to any disclaimer, the term of this patent is extended or adjusted under 35 U.S.C. 154(b) by 256 days.

(21) Appl. No.: 16/800,047

(22) Filed: Feb. 25, 2020

(65) Prior Publication Data

US 2021/0263959 A1    Aug. 26, 2021

(51) Int. Cl.
| | | |
|---|---|---|
| *G06F 16/34* | (2019.01) | |
| *G06F 9/54* | (2006.01) | |
| *H04L 51/52* | (2022.01) | |
| *H04L 51/216* | (2022.01) | |

(52) U.S. Cl.
CPC ............ *G06F 16/345* (2019.01); *G06F 9/542* (2013.01); *H04L 51/216* (2022.05); *H04L 51/52* (2022.05)

(58) Field of Classification Search
CPC ....... G06F 16/345; G06F 9/542; H04L 51/16; H04L 51/32
See application file for complete search history.

(56) References Cited

U.S. PATENT DOCUMENTS

| | | | |
|---|---|---|---|
| 9,705,829 | B2 | 7/2017 | Kleppmann |
| 9,832,787 | B2 | 11/2017 | Broomhall |
| 2007/0214097 | A1 | 9/2007 | Parsons |
| 2011/0276628 | A1 | 11/2011 | Pell |

(Continued)

FOREIGN PATENT DOCUMENTS

| | | |
|---|---|---|
| CN | 104782094 A | 7/2015 |
| CN | 108009136 A | 5/2018 |

OTHER PUBLICATIONS

Mell et al., "The NIST Definition of Cloud Computing", National Institute of Standards and Technology, Special Publication 800-145, Sep. 2011, 7 pages.

(Continued)

*Primary Examiner* — Thu V Huynh
(74) *Attorney, Agent, or Firm* — Jordan T. Schiller

(57) ABSTRACT

The method, computer program product and computer system may include computing device which may collect application data from an application and archive the application data into a datastore. The computing device may generate a network graph based on the archived application data. The computing device may detect a new message, containing content on one or more topics, posted in the application by an author. The computing device may determine familiarity of an anticipated user with the content of the new message and associate the new message with a message history in the application based on the anticipated user. The computing device may generate a message content summary of the new message based on the message history and present message content summary to the anticipated user.

20 Claims, 7 Drawing Sheets

(56) References Cited

U.S. PATENT DOCUMENTS

| | | | | |
|---|---|---|---|---|
| 2012/0089688 | A1* | 4/2012 | Harpur | G06Q 10/107 |
| | | | | 709/206 |
| 2012/0173632 | A1* | 7/2012 | Chakra | G06Q 10/107 |
| | | | | 709/206 |
| 2012/0209871 | A1* | 8/2012 | Lai | H04L 51/02 |
| | | | | 707/769 |
| 2014/0026071 | A1* | 1/2014 | Garcia-Martinez | G06Q 50/01 |
| | | | | 715/753 |
| 2014/0164478 | A1 | 6/2014 | Kleppmann | |
| 2015/0302103 | A1* | 10/2015 | Jeremias | G06F 3/04842 |
| | | | | 715/758 |
| 2016/0196561 | A1* | 7/2016 | Iyer | G06Q 30/016 |
| | | | | 705/304 |
| 2016/0344807 | A1 | 11/2016 | Arthurs | |
| 2016/0378850 | A1 | 12/2016 | Priel | |
| 2017/0353410 | A1* | 12/2017 | Gonzales | H04L 51/22 |
| 2018/0039893 | A1* | 2/2018 | Bastide | H04L 51/16 |
| 2019/0068477 | A1* | 2/2019 | Faulkner | H04L 41/142 |
| 2019/0317928 | A1* | 10/2019 | Hirata | H04L 51/16 |
| 2020/0311680 | A1* | 10/2020 | Wahl | H04L 51/56 |
| 2020/0356604 | A1* | 11/2020 | Macdougall | G06N 20/00 |
| 2021/0117213 | A1* | 4/2021 | Chen | H04L 65/4046 |
| 2021/0158458 | A1* | 5/2021 | Waldrop | H04L 65/4015 |
| 2021/0194843 | A1* | 6/2021 | Vendrow | H04L 51/226 |

OTHER PUBLICATIONS

Disclosed Anonymously, "Enterprise," Twitter Developer Platform [online], [accessed on Jan. 12, 2022], 5 pages, Retrieved from the Internet: <URL: https://developertwitter.com/en/docs/twitter-api/enterprise>.

Disclosed Anonymously, "Graph API Reference/{user-id}/friends," Meta for Developers [online], [accessed on Jan. 12, 2022], 6 pages, Retrieved from the Internet: <URL: https://developers.facebook.com/docs/graph-api/Yeference/v12.0/user/friends>.

Disclosed Anonymously, "Page Feed," Meta for Developers [online], [accessed on Jan. 12, 2022], 20 pages, Retrieved from the Internet: <URL: https://developers.facebook.com/docs/graph-api/reference/v12.0/page/feed>.

Disclosed Anonymously, "User Favorite Requests," Facebook for developers [online], [accessed on Jan. 12, 2022], 2 pages, Wayback Machine, Retrieved from the Internet: <URL: https://web.archive.org/web/20180309021541/https://developers.facebook.com/docs/graph-api/reference/user/favorite_requests/>.

Disclosed Anonymously, "User," Meta for Developers [online], [accessed on Jan. 12, 2022], 18 pages, Retrieved from the Internet: <URL: https://developers.facebook.com/docs/graph-api/reference/user>.

Disclosed Anonymously, "Watson Natural Language Understanding," IBM [online], [accessed on Jan. 12, 2022], 4 pages, Retrieved from the Internet: <URL: https://www.ibm.com/cloud/watson-natural-language-understanding>.

Disclosed Anonymously, "Webhook," Meta for Developers [online], [accessed on Jan. 12, 2022], 9 pages, Retrieved from the Internet: <URL: https://developers.facebook.com/docs/messenger-platform/webhook>.

Wikipedia, "Push technology," Wikipedia, the free encyclopedia [online], [accessed on Jan. 12, 2022], 7 pages, Retrieved from the Internet: <URL: https://en.wikipedia.org/wiki/Push_technology>.

* cited by examiner

CONTENT ANALYSIS AND CONTEXT SUMMARY GENERATION

BACKGROUND

The present invention relates generally to a method, system, and computer program for content analysis and context summary generation. More particularly, the present invention relates to a method, system, and computer program for user-specific context summary generation based on communication content analysis and user familiarity.

Online social networks and collaboration tools are connecting people and information in logical and organized ways to share and process information between users. The most common mechanisms of sharing and processing information are email, text messages, and social networks. These mechanisms enable one to rapidly share information with others, connect, gather and discuss many things and topics. Further, users may join or participate in communities dedicated to particular topics of interest to the user within online social networks and collaboration tools. Thus, online social networks and collaboration tools connects users to spaces and other users in particular areas of interest to the user.

BRIEF SUMMARY

An embodiment of the invention may include a method, computer program product and computer system for content analysis and context summary generation. The method, computer program product and computer system may include a computing device which may collect application data from an application and archive the application data into a datastore. The computing device may generate a network graph based on the archived application data. The computing device may detect a new message, containing content on one or more topics, posted in the application by an author. The computing device may determine familiarity of an anticipated user with the content of the new message and associate the new message with a message history in the application based on the anticipated user. The computing device may generate a message content summary of the new message based on the message history and present a message content summary to the anticipated user. Further, the computing device may generate a warning indicating the anticipated user is not familiar with the content of the new message, and may present the warning to the author of the new message.

DETAILED DESCRIPTION

Figure 1A:
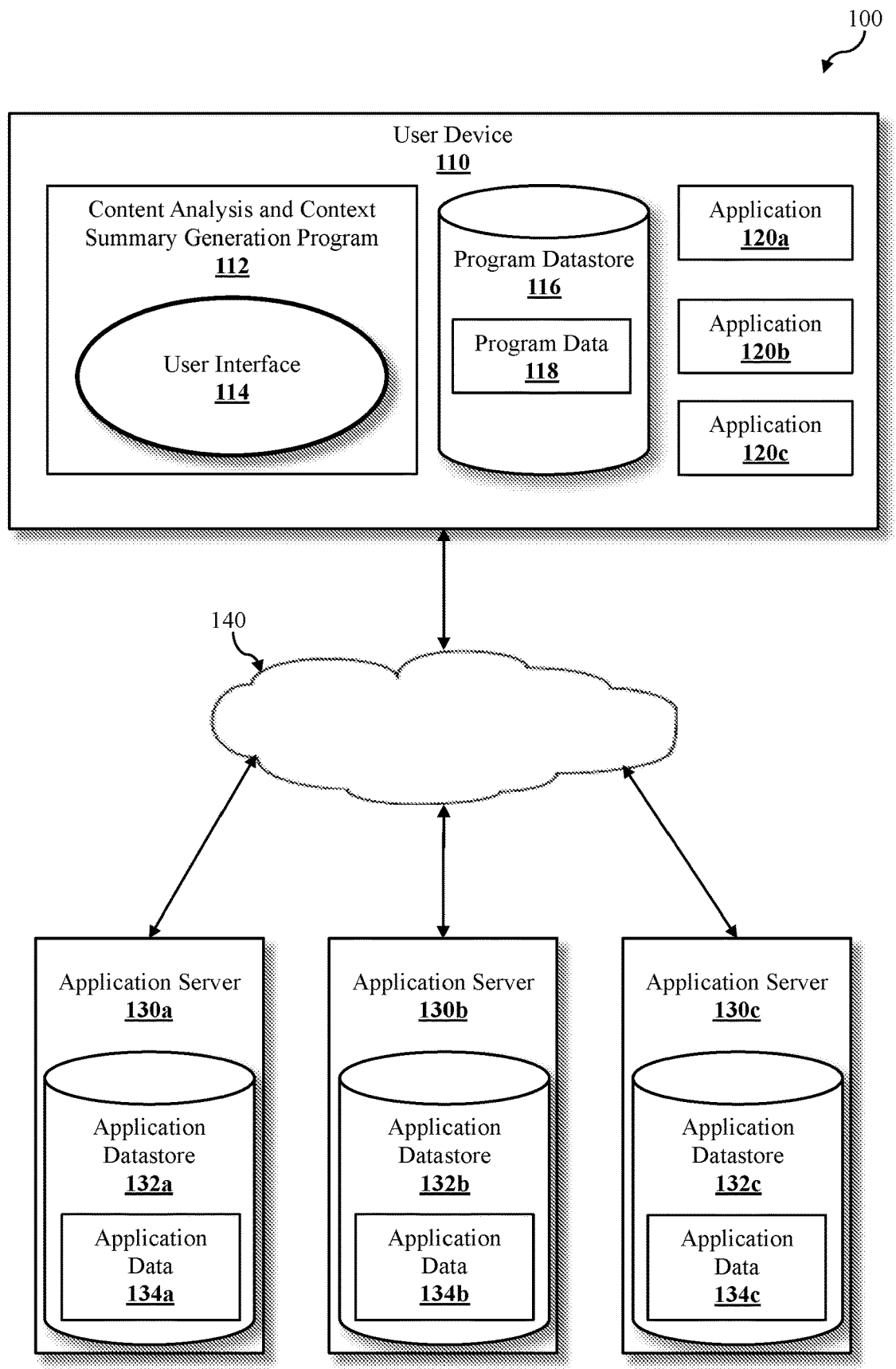
FIG. 1a illustrates a system for content analysis and context summary generation, in accordance with an embodiment of the invention.

Embodiments of the present invention will now be described in detail with reference to the accompanying Figures.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention provide a method, computer program, and computer system for content analysis and context summary generation. Conversational platforms are connecting people and information in logical and organized ways to share and process information between users. The most common mechanisms of sharing and processing information are the channel, inbox, text messages, wall, activity stream, timeline, comment stream and profile. These mechanisms enable one to rapidly share information with others, connect, gather and discuss many things and topics. The conversational mechanisms enable a person and a group to generate a narrative—a narrative that informs future decisions and actions. Each message—sent and received—establishes a history and a context for future messages. The message sent to users with a well-defined and shared history is quickly read and understood. The message sent to users without the well-defined and shared history is quickly read and at best dismissed and at worst misunderstood. Users without the well-defined and shared history may send one or more follow up messages to the originator of a message they don't fully understand. Further, a follow up message to the originator may include a question, requiring the originator to send a reply message answering the question. These follow up messages may be sent to all users of a particular communication channel. Follow up messages of this nature are not particularly relevant to users with the well-defined and shared history. Embodiments of the invention provide a method, computer program product, computer system to enable content analysis and contextual summary generation based on one or more users' familiarity with the content of a message using the users' past interactions on the messaging platform. Embodiments of the invention may reduce the number of messages sent in a communication channel that result when a recipient does not fully understand a message, thereby providing advantages of reduced traffic in an underlying communication network, reduced processing at user devices connected to the communication network, and reducing the number of messages sent to users with the well-defined and shared history. Embodiments of the invention are best illustrated in the scenario that follows below.

A conversational platform such as Slack® may have various communication channels dedicated to particular groups of people and topics. For example, Alice, Bob, Charlie and Eve may be members of the sales team at Company X and the sales team may communicate via Slack®. Alice, Bob, Charlie and Eve may be members of a Slack community channel called "#sales," which is exclusive to their team. However, each team member may also be members of other channels. For example, Alice and Bob may be on the channels "#sales", "#sales-wins", and "#exercise" while Charlie and Eve are only members of "#sales". Therefore, Charlie and Eve would not see any messages posted in the channels "#sales-wins", and "#exercise." Bob may have previously posted, e.g. authored a message, on the "#exercise" channel "I'll be lame for a couple of weeks; I twisted an ankle. I did finish the race," e.g. MSG1. Embodiments of the invention would detect the message from Bob, i.e. MSG1 and archive MSG1 into a datastore as discussed in more detail below with reference to FIG. 1b. As Alice's is about to view MSG1, embodiments of the invention may determine Alice's familiarity with the context of the message. Embodiments of the invention may determine that Alice last viewed a message from Bob today and last viewed messages in the "#exercise" channel a few moments ago. Further, embodiments of the invention may determine that Alice and Bob have a history of discussing "#exercise", "#medical-injury", and "#races" together. Alice may post in response to Bob on the "#exercise" channel "Get well, the team hopes to see you back at 100% soon," e.g. MSG2. Embodiments of the invention may detect MSG2 and archive MSG2 into a datastore as discussed in more detail below with reference to FIG. 1b. As Bob is about to view MSG2, embodiments of the invention may determine Bob's familiarity with the context of MSG2. Embodiments of the invention may determine that Bob posted MSG1 in the "#exercise" channel, Bob is the author of MSG1, Bob has "liked" MSG2. Thus, embodiments of the invention may detect a metadata update, e.g. Bob's "like" of MSG2, but would take no action as Bob is very familiar with the context of MSG2. on the social modality metadata.

Now consider Charlie and Eve who would not have any knowledge about MSG1 and MSG2 on the "#exercise" channel. Alice may decide to update her team on the about sales status on the "#sales" and author the message "As we approach the end of the month, we need to finish the race to the end of the line even if there is a twisted ankle," e.g. MSG3. Embodiments of the invention may detect MSG3 and archive MSG3 into a datastore as discussed in more detail below with reference to FIG. 1b. As Charlie's and Eve's views of the message are about to be rendered (e.g., the message is in a "draft" state, or Charlie and/or Eve have just logged on to the communication channel, etc.), embodiments of the invention may determine Charlie's and Eve's familiarity with the context of MSG3. Embodiments of the invention may determine that Charlie and Eve have authored messages to the channel "#sales" today, Charlie and Eve have not authored any messages on "#exercise", and that Charlie and Eve have not interacted with the topics of "#exercise" or "#health," e.g. no "likes" and no comments in those channels. Therefore, embodiments of the invention would determine that Charlie and Eve are not familiar with the topics of "#exercise" or "#health." Embodiments of the invention may associate Alice's message, i.e. MSG3, with a conjoined history of messages that establish the context of MSG3. Embodiments of the invention may utilize natural language processing to break down MSG3 and associate the content of MSG3 with past messages, e.g. MSG1, and MSG2 as follows: MSG1—#medical, #inspiration, #race, Bob, Alice; N-GRAMs [EMPTY-finished, twisted-ankle]; MSG2—#exercise, #care, Alice, Bob; MSG3—#exercise, #race, Alice; an d N-GRAMs [approach-the-end-of-the-month, twisted-ankle]. Embodiments of the invention may present MSG1 and MSG2 to Charlie to provide the context for the content of MSG3. For example, instead of Charlie and Eve only seeing MSG3, embodiments of the invention may present Charlie and Eve with the contextual message (which appeared in a communications channel not visible to Charlie and Eve), e.g. MSG1, in conjunction with MSG3 as follows:

Alice: "As we approach the end of the month, we need to finish the race to the finish line even if there is a twisted ankle." #sales History:

Bob: "I'll be lame for a couple of weeks; I twisted an ankle. I did finish the race."

Thus, embodiments of the present invention allow for Charlie and Eve to avoid misunderstandings and engage and collaborate on the discussion. Further, embodiments of the invention may present an author of a message, e.g. Alice, with a warning of contextual separation and separated history, such that Alice may edit or re-write the message to avoid any misunderstandings by the other members of the sale team. Alternatively, Alice may bind a tag to a user in response to a warning of contextual separation and separated history for the user, e.g., "Charlie: #inspiration; Alice: #inspiration Bob finished." In this alternative, a tag associated with one or more messages that will provide context for Alice's message to Bob may be attached or linked to Alice's message before it is sent. The embodiments of the invention discussed in the above scenario are described in further detail below with reference to FIGS. 1a-2.

Reference will now be made in detail to the embodiments of the present invention, examples of which are illustrated in the accompanying drawings, wherein like reference numerals refer to like elements throughout. Embodiments of the invention are generally directed to a system for content analysis and context summary generation.

FIG. 1a illustrates a content analysis and context summary generation system 100, in accordance with an embodiment of the invention. In an example embodiment, the content analysis and context summary generation system 100 may include user device 110, and application servers 130a, 130b, 130c interconnected via network 140.

In the example embodiment, the network 140 is the Internet, representing a worldwide collection of networks and gateways to support communications between devices connected to the Internet. The network 140 may include, for example, wired, wireless or fiber optic connections. In other embodiments, the network 140 may be implemented as an intranet, a local area network (LAN), a wide area network (WAN), or a wired or wireless personal area network (PAN). In general, the network 140 can be any combination of connections and protocols that will support communications between the user device 110 and the application servers 130a, 130b, 130c.

The user device 110 may include content analysis and summary generation program 112, program datastore 116, and applications 120a, 120b, 120c. In the example embodiment, the user device 110 may be a desktop computer, a notebook, a laptop computer, a tablet computer, a cellphone, a thin client, or any other electronic device or computing system capable of storing compiling and organizing audio, visual, or textual content and receiving and sending that content to and from other computing devices, such as the application servers 130a, 130b, 130c, and other user devices 110 via the network 140. The user device 110 is described in more detail with reference to FIG. 3. While only a single user device 110 is illustrated, it can be appreciated that any number of user devices 110 may be part of the content analysis and summary generation system 100.

The content analysis and context summary generation program 112 may include a user interface 114. The content analysis and summary generation program 112 is a program capable of detecting a new message on one of the applications 120a, 120b, 120c and determining the context of the new message based on one or more anticipated users. The content analysis and context summary generation program 112 may then generate a user-specific context summary of the new message based on an anticipated user's history and interactions with messages preceding the new message on the applications 120a, 120b, 120c. The content analysis and context summary generation program 112 is described in more detail below with reference to FIG. 1b.

The user interface 114 includes components used to receive input from a user on the user device 110 and transmit the input to the content analysis and context summary generation program 112, or conversely to receive information from the content analysis and context summary generation program 112 and display the information to the user on the user device 110. In an example embodiment, the user interface 114 uses a combination of technologies and devices, such as device drivers, to provide a platform to enable users of user device 110 to interact with the content analysis and context summary generation program 112. In the example embodiment, the user interface 114 receives input, such as but not limited to, textual, visual, or audio input received from a physical input device, such as but not limited to, a keypad, a mouse, a touchscreen, and/or a microphone.

The program datastore 116 may include program data 118. The program datastore 116 may be any storage media capable of storing and managing data, such as, but not limited to, storage media resident in the user device 110 and/or removeable storage media. For example, the program datastore 116 may be, but is not limited to, a hard drive, a solid stated drive, a USB drive, or a memory card, etc. The program datastore 116 may be, for example, but not limited to, an operational or an analytical datastore. Further, the program datastore 116 may be a collection of simple files, such as, but not limited to, e-mails, PDFs, word documents, spreadsheets, etc. The program data 118 may be a collection of the application data 134a, 134b, 134c associated with the applications 120a, 120b, 120c including, but not limited to, audio, visual, and textual files. For example, the program data 118 may include social media feed posts, online community discussion threads, online messages, emails, tweets, SMS texts, MMS texts, videos, etc. The program datastore 116 located on the user device 110 may be accessed through the network 140. In various embodiments, all or part of the program datastore 116 may be installed and run on the user device 110. The program datastore 116 is described in more detail with reference to FIG. 3.

The applications 120a, 120b, 120c be any online social network, online messaging application, and/or collaboration service such as, but not limited to, social media applications, email applications, and instant messaging applications, etc. Examples of such applications 120a, 120b, 120c may be Lotus Notes®, IBM® Sametime, IBM® Connections, Facebook®, Microsoft Outlook®, Gmail®, Slack®, Skype®, WhatsApp®, Apple iMessage, SMS, MMS, etc. While three applications 120a, 120b, 120c are illustrated, it can be appreciated that any number of applications 120 may be part of the content analysis and summary generation system 100 including less than three or more than three depending on the user. As described in the example above, the applications 120a, 120b, 120c may be a messaging platform such as Slack®. Thus, the content analysis and summary generation program 112 may use data, i.e. the application data 134a, 134b, 134c, associated with the application 120a, 120b, 120c to analyze the content of a user's feed and messages. The data associated with applications 120a, 120b, 120c, i.e. the application data 134a, 134b, 134c, may be stored on the application servers 130a, 130b, 130c associated with the applications 120a, 120b, 120c, respectively. For example, a user on the user device 110 may have Lotus Notes®, Facebook®, and Slack® accounts, i.e. the applications 120a, 120b, 120c, and the data associated with each of the applications 120a, 120b, 120c would be stored on the Lotus Notes®, Facebook®, and Slack®, servers, i.e., the application servers 130a, 130b, 130c. The user on the user device may authorize access to a network server or application server's access to the accounts.

The application servers 130a, 130b, 130c may include application datastores 132a, 132b, 132c. While three application servers 130a, 130b, 130c are illustrated, it can be appreciated that any number of application servers 130 may be part of the content analysis and summary generation system 100 including less than three or more than three depending on the user. In the example embodiment, the application servers 130a, 130b, 130c may be a desktop computer, a notebook, a laptop computer, a tablet computer, a thin client, or any other electronic device or computing system capable of storing compiling and organizing audio, visual, or textual content and receiving and sending that content to and from other computing devices, such as the user device 110 via the network 140. In some embodiments, the application servers 130a, 130b, 130c include a collection of devices or data sources. The application servers 130a, 130b, 130c are described in more detail with reference to FIG. 3.

The application datastores 132a, 132b, 132c may store the application data 134a, 134b, 134c associated with the applications 120a, 120b, 120c including, but not limited to, audio, visual, and textual files. For example, the application data 134a, 134b, 134c may include social media feed posts, online messages, emails, tweets, SMS messages, MMS messages, etc. The application datastores 132a, 132b, 132c may be any storage media capable of storing data capable of storing data, such as, but not limited to, storage media resident in the application servers 130a, 130b, 130c and/or removeable storage media. For example, the application datastores 132a, 132b, 132c may be, but are not limited to, a hard drive, a solid stated drive, a USB drive, or a memory card, etc. The application datastores 132a, 132b, 132c located on the third-party servers 130a, 130b, 130c may be accessed through the network 140. In various embodiments, all or part of the application datastores 132a, 132b, 132c may be installed and run on the application servers 130a, 130b, 130c. The application datastores 132a, 132b, 132c are described in more detail with reference to FIG. 3.

Figure 1B:
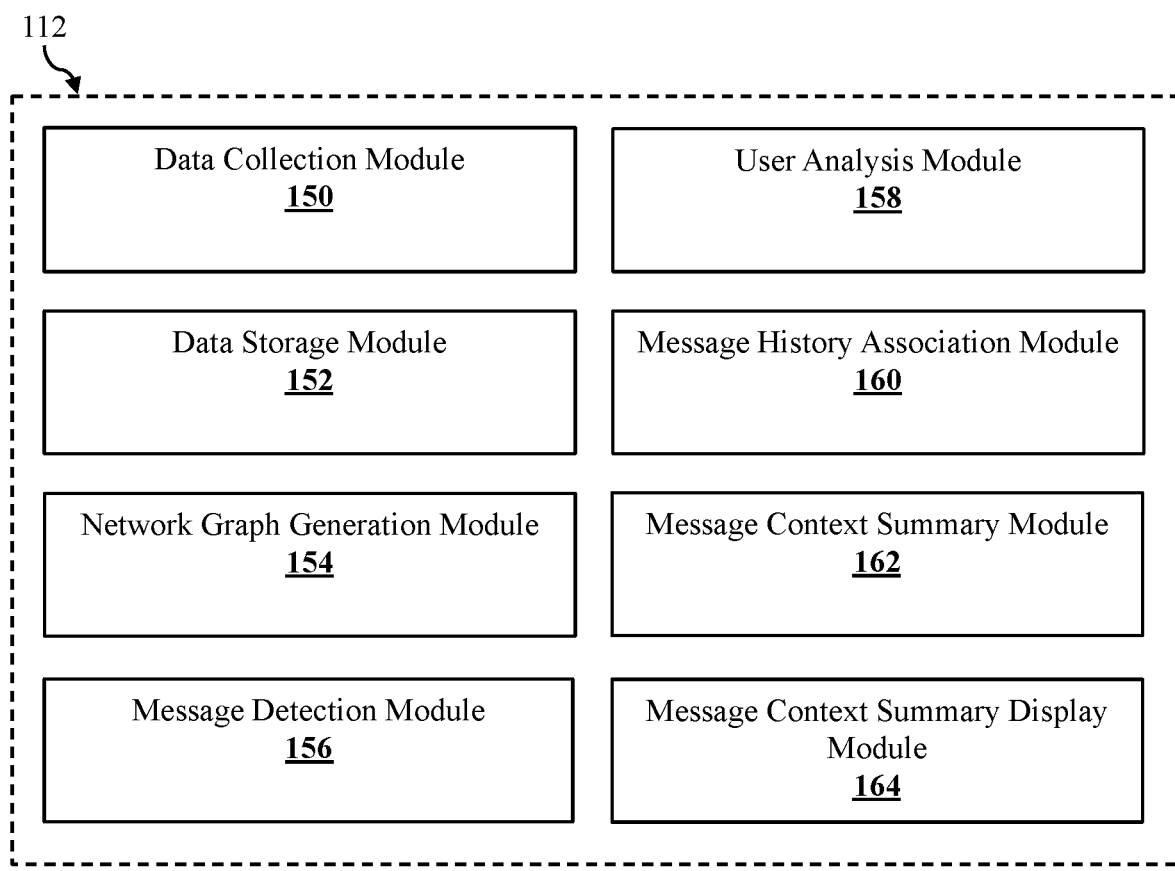
FIG. 1b illustrates example operating modules of the content analysis and context summary generation program of FIG. 1a, in accordance with an embodiment of the invention.

Referring to FIG. 1b, example modules of the content analysis and summary generation program 112 are illustrated. In an example embodiment, the content analysis and summary generation program 112 may include eight modules: the data collection module 150, the data storage module 152, the network graph generation module 154, the message detection module 156, the user analysis module 158, the message history association module 160, the message context summary module 162, and the message context summary display module 164.

The data collection module 150 collects the application data 134a, 134b, 134c associated with the applications 120a, 120b, 120c. For example, the data collection module 150 may collect the application data 134a, 134b, 134c associated with a plurality of collaboration and social media communication services, such as, but not limited to, Lotus Notes®, IBM® Sametime, IBM® Connections, Facebook®, Microsoft Outlook®, Gmail®, Slack®, Skype®, WhatsApp®, Apple iMessage, SMS platforms, and MMS platforms, etc. The data collection module 150 may use any data archiving tool capable of collecting and archiving collaboration and social media communications, such as, but not limited to, application programming interfaces (APIs). For example, the data collection module 150 may use a Gnip® API, a Smarsh® API, webhooks, application specific push notifications, RSS feed queries, API queries, or a user interface extension, such as a text command, a menu option, or a browser interceptor, etc. to collect the application data 134a, 134b, 134c. The data collection module 150 may collect the application data 134a, 134b, 134c in real-time or may collect the application data 134a, 134b, 134c in a batch at specified time intervals such as, but not limited to, every 30 seconds, every minute, every 15 minutes, every 30 minutes, every hour, once a day, once a week, once a month, etc. Thus, the data collection module 150 may constantly collect the application data 134a, 134b, 134c from the application servers 130a, 130b, 130c.

The data storage module 152 loads the application data 134a, 134b, 134c which has been collected by the data collection module 150 into the program datastore 116 as the program data 118. The data storage module 152 may store the message data 134a, 134b, 134c in the program datastore 116 using an archive solution such as, but not limited to, Apache HDFS, or Smarsh® Archiving. The data storage module 152 may extract certain content of the application data 134a, 134b, 134c such as, but not limited to, message details, topic concepts, unique message identifiers, conversation identifiers, access control details, owner details, tenant details, location details, terminal details, and weight details, etc. Message details may include, but are not limited to, the body of the message, the subject of the message, metadata associated with the message, etc. Message identifiers and conversation identifiers may include, but are not limited to message recipient data, conversation-id, e.g. a username, and thread-id, etc. Access control details may include, but are not limited to, the membership list, e.g. permissioned users, of a conversation thread. Owner details may include, but are not limited to, the owner, e.g. author, of a specific message. Location details may include, but are not limited to, global positioning system (GPS) data, longitude and latitude data, regional identification data, etc. Tenant details may include, but are not limited to, the company or group assigned to a conversation thread. Terminal details may indicate if a specific message is the last message in a conversation thread. Weight details may include, but are not limited to, message and conversation thread views, user participation metrics, reply-marks, read-marks, "like" data, e.g. Facebook® "likes", up/down vote data, e.g. Reddit® votes, re-tweets on Twitter®, etc. In embodiments of the invention, the data storage module 152 may extract certain content of the application data 134a, 134b, 134c related to each author and reader of a specific message such as, but not limited to, person references, message identifiers, conversation identifiers, and message details. Person references may include, but are not limited to, person identifiers, e.g. a name, an e-mail address, or a username, in the "To", "CC", "BCC" fields of a message, and person identifiers in the text of a message, etc. Further, in embodiments of the invention, the data storage module 152 may extract certain social media application content contained in the application data 134a, 134b, 134c related to each author and reader of a specific message such as, but not limited to, the Facebook® "likes," Facebook® "dislikes," LinkedIn® "likes," Reddit® "upvotes," and Reddit® "downvotes," etc. The data storage module 152 may populate the program datastore 116 using natural language processing (NLP) such as, but not limited to, IBM® Watson natural language classifier (NLC), IBM® Watson natural language understanding (NLU), deep learning algorithms, and/or deep neural networks, e.g. deep convolutional neural networks. NLC models include multiple Support Vector Machines (SVMs) and a Convolutional Neural Network (CNNs). The data storage module 152 may use NLP to perform various methods and techniques for analyzing the application data 134a, 134b, 134c such as, but not limited to, syntactic analysis, and semantic analysis, etc. Further, the data storage module 152 may use NLP to parse passages of the application data 134a, 134b, 134c. For example, the data storage module 152 may use NLP to perform lexical analysis of the application data 134a, 134b, 134c to convert a sequence of characters contained within the application data 134a, 134b, 134c into a sequence of tokens. A token may be a string of characters included in the application data 134a, 134b, 134c and categorized as a meaningful symbol. Further, in some embodiments, the data storage module 152 may identify word boundaries in application data 134a, 134b, 134c and break any text passages within the application data 134a, 134b, 134c into their component text elements, such as words, multiword tokens, numbers, and punctuation marks. In some embodiments, the data storage module 152 may receive a string of characters from the application data 134a, 134b, 134c, identify the lexemes in the string, and categorize them into tokens. Consistent with various embodiments, the data storage module 152 may mark up a word in passages from the application data 134a, 134b, 134c to correspond to a particular part of speech. The data storage module 152 may read a passage or other text in natural language and assign a part of speech to each word or other token. The data storage module 152 may determine the part of speech to which a word (or other text element) corresponds based on the definition of the word and the context of the word. The context of a word may be based on its relationship with adjacent and related words in a phrase, sentence, or paragraph. In some embodiments, the context of a word may be dependent on one or more previously analyzed application data 134a, 134b, 134c (e.g., the content of message may shed light on the meaning of text elements in related message, or content of a first message by a user on an social networking system may shed light on meaning of text elements of a second message by that user on the same or different social networking system). Examples of parts of speech that may be assigned to words include, but are not limited to, nouns, verbs, adjectives, adverbs, and the like. Examples of other part of speech categories that data storage module 152 may assign include, but are not limited to, comparative or superlative adverbs, wh-adverbs, conjunctions, determiners, negative particles, possessive markers, prepositions, wh-pronouns, and the like. In some embodiments, the data storage module 152 may tag or otherwise annotate tokens of a passage with part of speech categories. In some embodiments, the data storage module 152 may tag tokens or words of a passage to be parsed using NLP. In some embodiments, the data storage module 152 may identify semantic relationships of recognized text elements (e.g., words, phrases) in the application data 134*a*, 134*b*, 134*c*. In some embodiments, the data storage module 152 may determine functional dependencies between entities and other semantic relationships. Consistent with various embodiments, the data storage module 152 may identify syntactic relationships in a passage composed of tokens. The data storage module 152 may determine the grammatical structure of sentences such as, for example, which groups of words are associated as phrases and which word is the subject or object of a verb. The data storage module 152 may conform to formal grammar.

Further, the data storage module 152 may contain opt-in and opt-out parameters for inclusion of the application data 134*a*, 134*b*, 134*c*, into the program datastore 116.

Figure 1C:
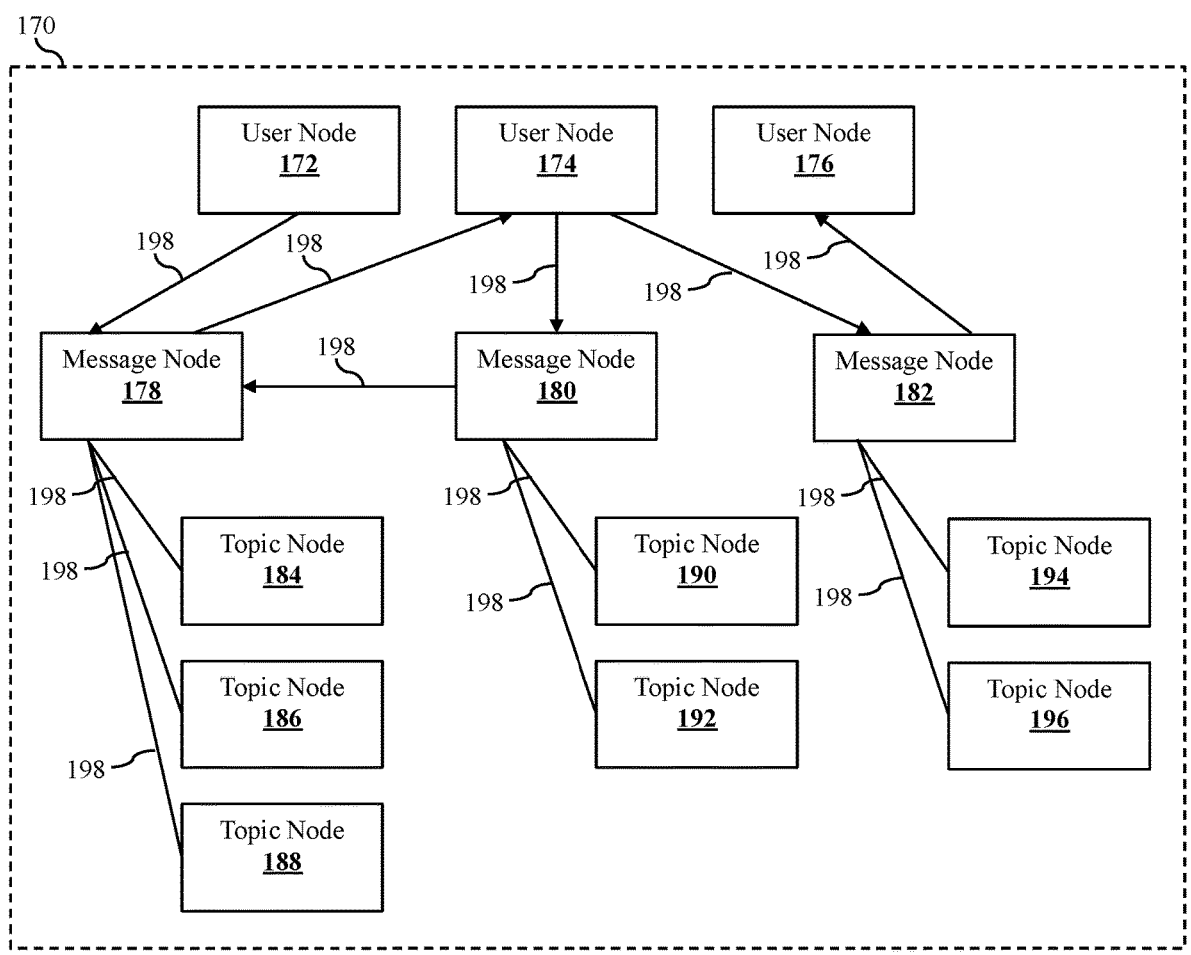
FIG. 1c illustrates an example network graph generated by the content analysis and context summary generation program of FIG. 1a, in accordance with an embodiment of the invention.

The network graph generation module 154 generates a network graph based on the archived application data 134*a*, 134*b*, 134*c*, i.e. the program data 118. The network graph generation module 154 may load the archived application data 134*a*, 134*b*, 134*c* into a non-relational database management system coupled with an analytics engine and graphing application program interface (API) to generate the network graph. An example non-relational database management system may be, but is not limited to, Apache HBase, etc. The analytics engine may be, but is not limited to, Apache Spark™, etc. The graphing API may be, but is not limited to, Apache Spark™ GraphX, etc. When the application data 134*a*, 134*b*, 134*c* is loaded into a non-relational database management system, the application data 134*a*, 134*b*, 134*c* may be de-duplicated, e.g. only a single piece of data is used when multiple instances of the same piece of data is stored in the application data 134*a*, 134*b*, 134*c*. For example, an e-mail message may be forwarded on to various people, creating duplicate message data as the message content itself would remain the same, but the recipient data would change. Thus, the message data would be de-duplicated such that the message content was only loaded once, but the various recipient data would be retained. The network graph may contain edges which connect to one or more nodes. The network graph edges may be identified as composite keys, e.g. a combination of two or more attributes (e.g. nodes) such as, but not limited to, two or more columns in a table, etc. that can be used to uniquely identify an entity occurrence, such as, but not limited to a table row, etc. For example, the application data 134*a* may be an e-mail message and the network graph may contain nodes such as, but not limited to, message topics, users, e.g. message author(s) and message readers, connected by edges which link the users to the message topics based on the application data 134*a*, 134*b*, 134*c* such as user actions, e.g. a "like", "view", and "author". Continuing with the previous example, the application data 134*a* may be an e-mail message which covers two different topics. The network graph would illustrate the connections, e.g. edges, between the message topics, the users, and the user's actions associated with each topic contained within the email data. FIG. 1*c* illustrates an example network graph 170 based on the scenario described above. The network graph 170 contains user nodes 172-176, message nodes 178-182, and topic nodes 184-196 connected by edges 198. The user nodes 172-176 may represent Alice, Bob, and Charlie, respectively, the message nodes 178-182 may represent MSG1, MSG2, and MSG3, respectively, and the topic nodes 184-196 may represent the topics of MSG1, MSG2, and MSG3. The edges 198 represent the connections between the different nodes, such as, but not limited to, user actions.

The message detection module 156 detects when new application data 134*a*, 134*b*, 134*c* is available on one or more of the applications 120*a*, 120*b*, 120*c*. For example, but not limited to, the message detection module 156 may detect when a new Slack® message, e.g. application data 134*a*, is posted on a Slack® Channel message board, e.g. the application 120*a*. Further, the message detection module 156 determines whether the new application data 134*a*, e.g. a new Slack® message, is a reply to an existing conversation-id within the application 120*a* or a unique message, e.g. the first message of a conversation. The message detection module 156 may determine that the new application data 134*a*, e.g. a new Slack® message, is a unique message based on existing message-ids and/or conversation-ids, i.e. the message does not match any existing message-ids and/or conversation-ids.

The user analysis module 158 determines one or more anticipated user's familiarity with content of a new message contained within the application data 134*a*, 134*b*, 134*c* available on one or more of the applications 120*a*, 120*b*, 120*c*. An anticipated user is any user who may have access to the new application data 134*a* such as, but not limited to, all members of a Slack® community channel, all recipients of an e-mail message, the author of the new application data 134*a*, all the users in the author's social media network, etc. Continuing with the above example, the user analysis module 158 may determine one or more anticipated user's, e.g. all members in Slack® community channel, familiarity with a new Slack® message and any topics contained within the new Slack® message. The user analysis module 158 may determine an anticipated user's familiarity with the new application data 134*a* by querying the network graph. User familiarity may be based on the number of connections between the user and the extracted content, e.g. message topics, of the message data 134*a* in the network graph with more connections meaning greater familiarity with the message data 134*a*. For example, the new application data 134*a* may be a new Slack® message in a Slack® community channel having four members, and the Slack® channel may have fifty previous messages which cover various topics, related and un-related, to the most recent message, e.g. new application data 134*a*. The user analysis module 158 will determine the familiarity of all four members of the Slack® community channel with the new Slack® message based on each member's interactions with related messages, e.g. related application data 134*a*, 134*b*, 134*c*, contained within the Slack® community channel. The number of connections between the anticipated user and the network graph needed to determine if the anticipated user is familiar may be a threshold defined manually by a user of the content analysis and context summary generation program 112, or may be a pre-defined threshold defined by the content analysis and context summary generation program 112. If the number of connections exceeds the threshold, the user analysis module 158 would determine that the anticipated user is familiar with the new message contained within the application data 134*a*, 134*b*, 134*c*. If the number of connections does not exceed the threshold, the user analysis module 158 would determine that anticipated user is not familiar with the new message contained within the application data 134*a*, 134*b*, 134*c*.

The message history association module 160 associates the new message contained within the application data 134*a*, 134*b*, 134*c* with a message history from the applications 120*a*, 120*b*, 120*c* based on an anticipated user's familiarity. The message history provides an anticipated user with the context to understand the new message. The message history analysis module 160 may associate the new message contained within the application data 134*a*, 134*b*, 134*c* with a message history from the applications 120*a*, 120*b*, 120*c* based on an anticipated user using the network graph. For example, the content of the new message may be associated with any related message based on the extracted content of the application data 134*a*, 134*b*, 134*c* such as, but not limited to, message details, topic concepts, unique message identifiers, conversation identifiers, access control details, owner details, tenant details, location details, terminal details, and weight details, etc. The message history may be previously archived application data 134*a*, 134*b*, 134*c* related to the new application data 134*a*, 134*b*, 134*c*. For example, a new Slack® message would be associated with all previously related Slack® messages, e.g. all previous message from the same Slack® community channel with a similar topic. Further, the message history is based on an anticipated user's familiarity, e.g. member of the Slack® community channel in which the new message was posted, and their previous interactions on the applications 120*a*, 120*b*, 120*c*. Thus, the more familiar an anticipated user is, the less message history that is needed to provide context for that anticipated user. In contrast, if an anticipated user has not interacted at all with the Slack® community channel in which the new message was posted, that anticipated user will need a more thorough context summary to enable that anticipated user to understand the content of the new message. For example, but not limited to, a Slack® message may cover three different topics, and each anticipated user, e.g. each member of the Slack® community channel, may have different familiarly with each of the three topics. Therefore, the message history will be unique for each anticipated user. In embodiments of the invention, the message history association module 160 may associate the new message contained within the application data 134*a*, 134*b*, 134*c* with similar messages, e.g. analogue messages, contained in the applications 120*a*, 120*b*, 120*c* if no message history is found.

The message context summary module 162 generates a message context summary of the new message contained within the application data 134*a*, 134*b*, 134*c* based on the message history. The message context summary may be, but is not limited to, a textual summary of messages, a thread of previous messages, a link to the message history, etc. The message context summary module 162 may further breakdown the message context summary of the new message based on all the topics contained within the new message. The message context summary module 162 may use any data analysis tool capable of processing the application data 134*a*, 134*b*, 134*c* to generate the message context summary, such as, but not limited to, application programming interfaces (APIs), or algorithms leveraging templates or natural language processing (NLP), etc. APIs and NLP are described in more detail above. For example, a new Slack® message may cover three different topics and the message context summary module 162 may generate a message context summary for each topic. In embodiments of the invention, the message context summary module 162 may limit the message context summary based on one or more factors such as, but not limited to, time and message significance. For example, but not limited to, the message context summary module 162 may limit the message context summary to messages contained within the message history that were transmitted within the same hour, day, or week, etc. as the new message. Further, the message context summary module 162 may limit the message context summary to significant messages contained within the message history. For example, the message context summary module 162 may eliminate one-word response messages such as, but not limited to, "ok", "lol", etc. In embodiments of the invention the message context summary module 162 generates a warning to the author of the new message contained within the application data 134*a*, 134*b*, 134*c* indicating one or more anticipated users is not familiar with the content associated with the new message. For example, an author may post a new Slack® message to a new Slack® community channel with three community members, but one of the members has not interacted at all with the Slack® community channel; therefore, the message context summary module 162 may generate a warning to the author of the new application data 124*a*, 134*b*, 134*c*, e.g., a new Slack® message, identifying the Slack® community channel member who will not be familiar with the content of the new message. Thus, the content analysis and context summary generation program 112 provides an opportunity for the author of a new message to re-write or edit the message in a way that will not confuse any anticipated user.

The message context summary display module 164 presents the message context summary to the anticipated user. The message context summary display module 164 may organize the data included in the context summary which connects the anticipated user to the content of the new message chronologically. For example, the data included in the context summary may be various social media posts, e.g. Slack® messages, from the application 120*a*, e.g. Slack®, and the message context summary display module 164 may display the social media posts from the application 120*a* as a flat list with the posts displayed in chronological order. The message context summary display module 164 may present the message context summary to an anticipated user using for example, but not limited to, the user interface 114, or the applications 120*a*, 120*b*, 120*c*, etc. In embodiments of the invention the message context summary display module 164 presents the generated warning to the author of a new application data 134*a*, 134*b*, 134*c*. The message context summary display module 164 may present the generated warning to the author using for example, but not limited to, the user interface 114, or the applications 120*a*, 120*b*, 120*c*, etc.

Figure 2:
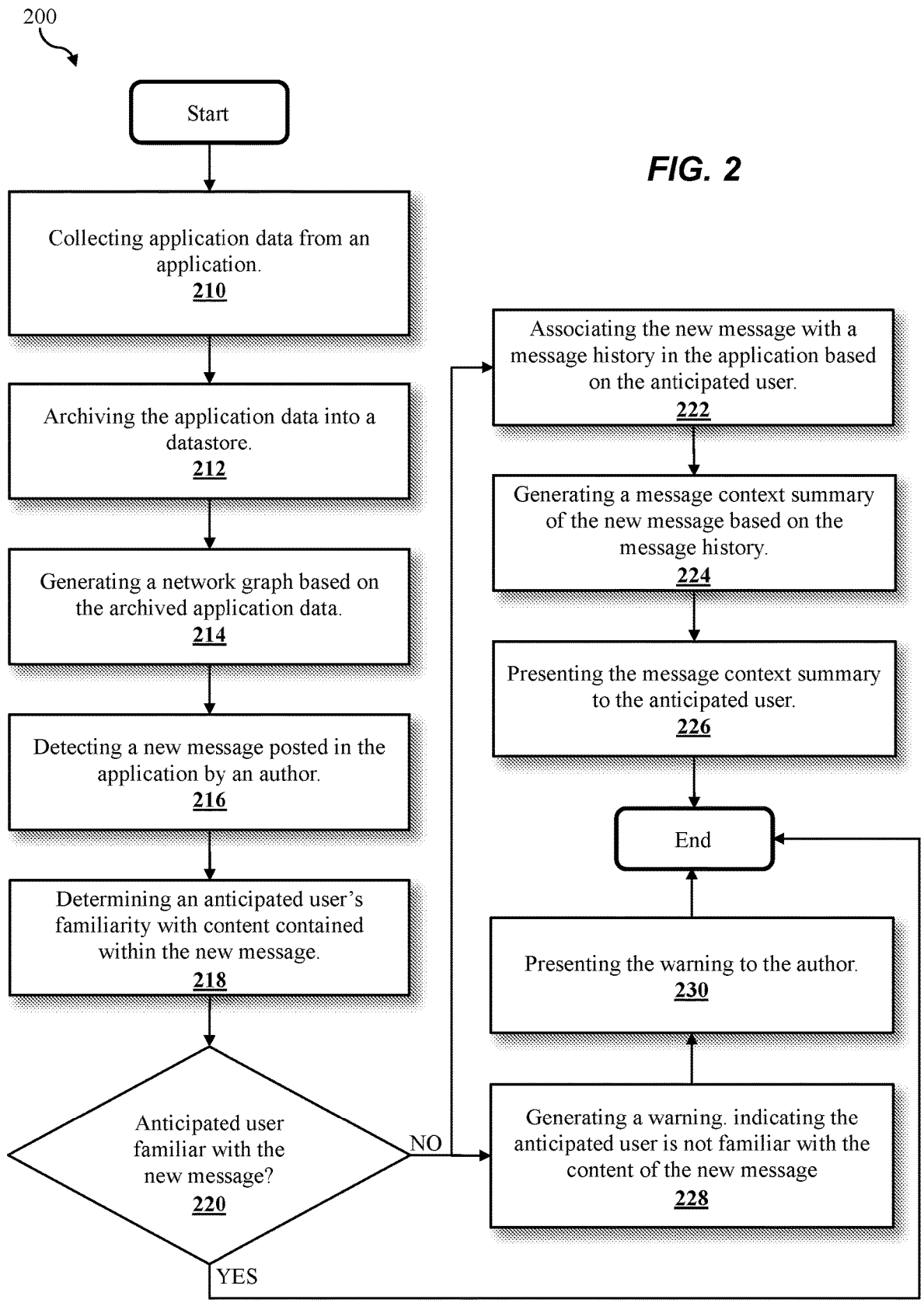
FIG. 2 is a flowchart illustrating an example method of the content analysis and context summary generation system, in accordance with an embodiment of the invention.

Referring to FIG. 2, a method 200 for content analysis and context summary generation is depicted, in accordance with an embodiment of the present invention.

Referring to block 210, the content analysis and context summary generation program 112 collects the application data 134*a*, 134*b*, 134*c* from one or more of the applications 120*a*, 120*b*, 120*c*. Data collection is described in more detail above with reference to the data collection module 150.

Referring to block 212, the content analysis and context summary generation program 112 loads the application data 134*a*, 134*b*, 134*c* into the datastore 116 as program data 118 utilizing an archiving solution. Message data archiving is described in more detail above with reference to the data storage module 152.

Referring to block 214, the content analysis and context summary generation program 112 generates a network graph based on the archived applications data 134*a*, 134*b*, 134*c*. Network graph generation is described in more detail above with reference to the network graph generation module 154.

Referring to block 216, the content analysis and context summary generation program 112 detects new application data 134*a*, 134*b*, 134*c*, e.g. a new message, on one of the applications 120*a*, 120*b*, 120*c*. Message detection is described in more detail above with reference to the message detection module 156. In an embodiment, the content analysis and context summary generation program 112 may detect a new message before it is transmitted, posted, or otherwise available for anticipated users to view, which may be referred to herein as a draft new message.

Referring to block 218, the content analysis and context summary generation program 112 determines one or more anticipated user's familiarity with content of a new message contained within the application data 134*a*, 134*b*, 134*c* available on one or more of the applications 120*a*, 120*b*, 120*c*. Anticipated user familiarity is described in more detail above with reference to the user analysis module 158.

Referring to block 220, the content analysis and context summary generation program 112 determines if an anticipated user's familiarity with the new message exceeds a threshold. If the content analysis and context summary generation program 112 determines that an anticipated user's familiarity with the new message does exceed a threshold, the content analysis and context summary generation program 112 proceeds to terminate. If the content analysis and context summary generation program 112 determines that an anticipated user's familiarity with the new message (or a draft new message) does not exceed a threshold, the content analysis and context summary generation program 112 proceeds to blocks 222-226 and 228-230. The content analysis and context summary generation program 112 may proceed only through blocks 222-226, only through blocks 228-230, through blocks 222-226 and 228-230 concurrently, or through blocks 222-226 and 228-230 consecutively.

Referring to block 222, the content analysis and context summary generation program 112 associates the new message contained within the application data 134*a*, 134*b*, 134*c* with a message history from the applications 120*a*, 120*b*, 120*c* based on an anticipated user's familiarity. Message history association is described in more detail above with reference to the message history association module 160.

Referring to block 224, the content analysis and context summary generation program 112 generates a message context summary of the new message contained within the application data 134*a*, 134*b*, 134*c* based on the message history. Message context summary generation is described in more detail above with reference to the message context summary module 162.

Referring to block 226, the content analysis and context summary generation program 112 presents the message context summary to the anticipated user. Message context summary presentation is described in more detail above with reference to the message context summary display module 164.

Referring to block 228, the content analysis and context summary generation program 112 generates a warning to the author of the new message or draft new message contained within the application data 134*a*, 134*b*, 134*c* indicating one or more anticipated users is not familiar with the content associated with the new message. Warning generation is described in more detail above with reference to the message context summary module 162. Generating a warning for a draft new message before the message is sent permits the author to add content to the message or bind a tag to a message.

Referring to block 230, the content analysis and context summary generation program 112 presents the generated warning to the author of a new application data 134*a*, 134*b*, 134*c*. Warning presentation is described in more detail above with reference to the message context summary display module 164.

Figure 3:
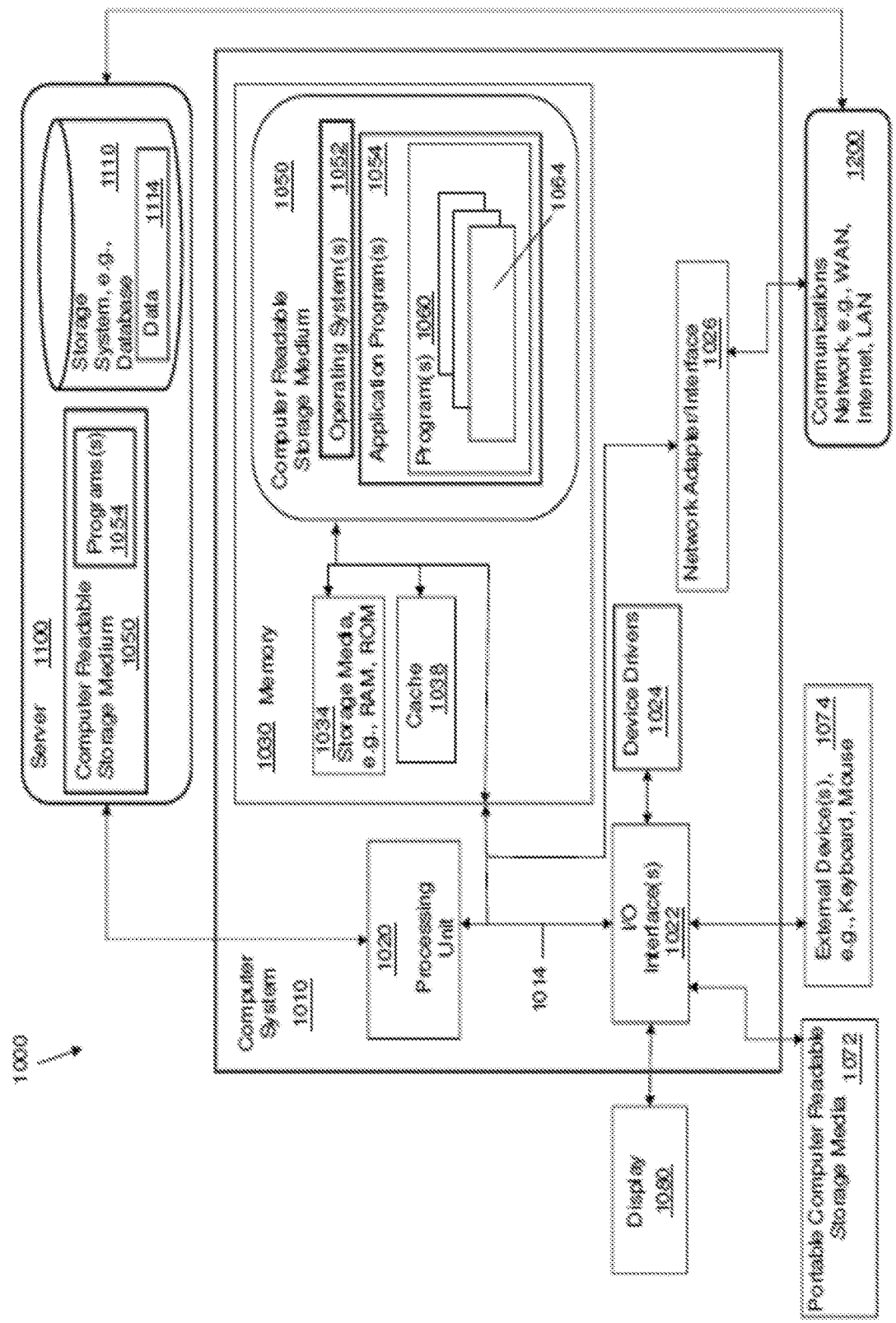
FIG. 3 is a block diagram depicting the hardware components of the content analysis and context summary generation system of FIG. 1, in accordance with an embodiment of the invention.

Referring to FIG. 3, a system 1000 includes a computer system or computer 1010 shown in the form of a generic computing device. The method 200, for example, may be embodied in a program(s) 1060 (FIG. 3) embodied on a computer readable storage device, for example, generally referred to as memory 1030 and more specifically, computer readable storage medium 1050 as shown in FIG. 3. For example, memory 1030 can include storage media 1034 such as RAM (Random Access Memory) or ROM (Read Only Memory), and cache memory 1038. The program 1060 is executable by the processing unit or processor 1020 of the computer system 1010 (to execute program steps, code, or program code). Additional data storage may also be embodied as a database 1110 which can include data 1114. The computer system 1010 and the program 1060 shown in FIG. 3 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in FIG. 3 as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, as shown in FIG. 3, the system 1000 includes the computer system 1010 shown in the form of a general-purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media 1034 in the form of volatile memory, such as random access memory (RAM), and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method 200 (FIG. 2), for example, may be embodied in one or more computer programs, generically referred to as a program(s) 1060 and can be stored in memory 1030 in the computer readable storage medium 1050. For example, the program 1060 can include the modules 150-164 described above with reference to FIG. 1b. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
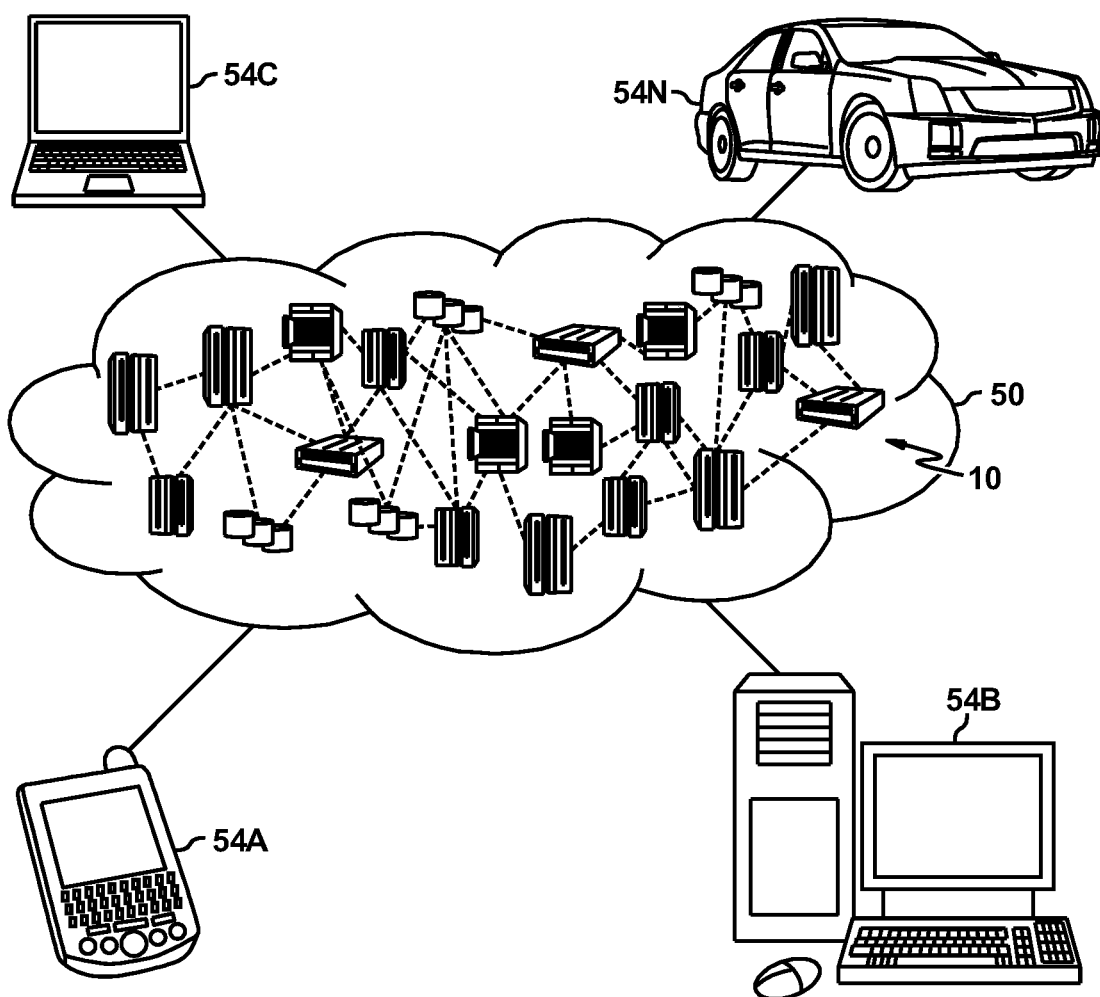
FIG. 4 illustrates a cloud computing environment, in accordance with an embodiment of the invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
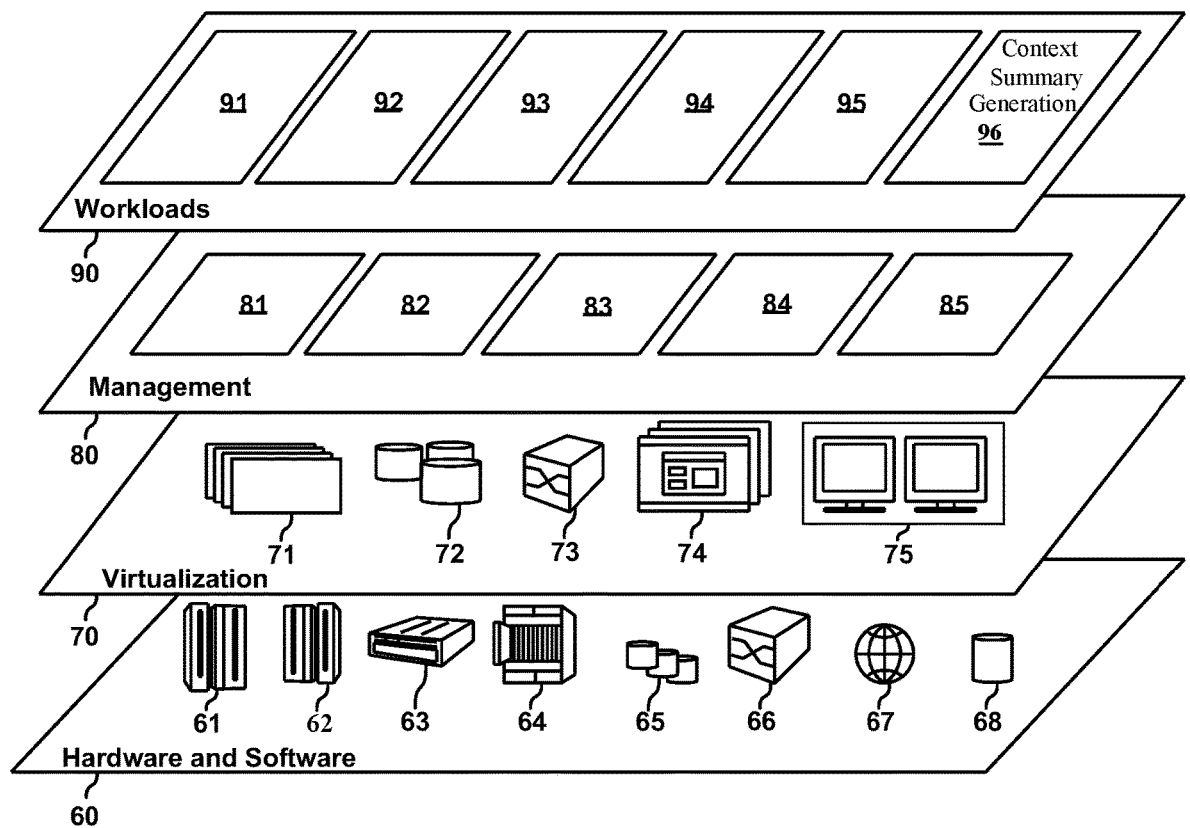
FIG. 5 illustrates a set of functional abstraction layers provided by the cloud computing environment of FIG. 4, in accordance with an embodiment of the invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and context summary generation 96.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

What is claimed is:

1. A method for message context summary generation, the method comprising:
    collecting, by a computing device, application data from an application;
    archiving, by the computing device, the application data into a datastore;
    generating, by the computing device, a network graph based on the archived application data;
    detecting, by the computing device, a new message posted in the application by an author; the new message containing content on one or more topics;
    determining, by the computing device, familiarity of the content of the new message by an anticipated user, wherein familiarity is based on the anticipated user's interaction history with the author over a plurality of channels within the application, and wherein the anticipated user's interaction history includes a time of last viewing one or more relevant messages of the author over the plurality of channels, commenting on the one or more relevant messages of the author over the plurality of channels, and participation metrics between the anticipated user and the one or more relevant messages of the author over the plurality of channels;
    associating, by the computing device, the new message with a conjoined message history in the application to establish a context, based on the anticipated user, wherein the conjoined message history may comprise one or more logically ordered messages between various users over the plurality of channels within the application;
    generating, by the computing device, a message content summary and context of the new message based on the conjoined message history; and
    presenting, by the computing device, the message content summary and context in a sequence of contextual messages, to the anticipated user, wherein the sequence of contextual messages allows the author and the anticipated user to avoid misunderstandings and more fully engage in a discussion within the channel.

2. The method as in claim 1, further comprising:
    generating, by the computing device, a warning indicating the anticipated user is not familiar with the content of the new message; and
    presenting, by the computing device, the warning to the author of the new message.

3. The method as in claim 1, wherein determining, by the computing device, familiarity of an anticipated user with the content of the new message is based on a number of connections in the network graph.

4. The method as in claim 1, wherein generating, by the computing device, a message content summary of the new message based on the message history is in response to determining the familiarity of the anticipated user does not exceed a threshold.

5. The method of claim 1, wherein the anticipated user is any user who may view the new message.

6. The method as in claim 1, wherein the message context summary comprises one or more past messages related to the new message on the application based on the network graph.

7. The method as in claim 1, wherein the message context summary is presented to the anticipated user via a user interface.

8. A computer program product for message context summary generation, the computer program product comprising:
    a computer-readable storage medium having program instructions embodied therewith, wherein a computer readable storage medium is not a transitory signal per se, the program instructions executable by the computer to cause the computer to perform a method, comprising:

collecting, by a computing device, application data from an application;

archiving, by the computing device, the application data into a datastore;

generating, by the computing device, a network graph based on the archived application data;

detecting, by the computing device, a new message posted in the application by an author; the new message containing content on one or more topics;

determining, by the computing device, familiarity of the content of the new message by an anticipated user, wherein familiarity is based on the anticipated user's interaction history with the author over a plurality of channels within the application, and wherein the anticipated user's interaction history includes a time of last viewing one or more relevant messages of the author over the plurality of channels, commenting on the one or more relevant messages of the author over the plurality of channels, and participation metrics between the anticipated user and the one or more relevant messages of the author over the plurality of channels;

associating, by the computing device, the new message with a conjoined message history in the application to establish a context, based on the anticipated user, wherein the conjoined message history may comprise one or more logically ordered messages between various users over the plurality of channels within the application;

generating, by the computing device, a message content summary and context of the new message based on the conjoined message history; and presenting, by the computing device, the message content summary and context in a sequence of contextual messages, to the anticipated user, wherein the sequence of contextual messages allows the author and the anticipated user to avoid misunderstandings and more fully engage in a discussion within the channel.

9. The computer program product as in claim 8, further comprising:

generating, by the computing device, a warning indicating the anticipated user is not familiar with the content of the new message; and presenting, by the computing device, the warning to the author of the new message.

10. The computer program product as in claim 8, wherein determining, by the computing device, familiarity of an anticipated user with the content of the new message is based on a number of connections in the network graph.

11. The computer program product as in claim 8, wherein generating, by the computing device, a message content summary of the new message based on the message history is in response to determining the familiarity of the anticipated user does not exceed a threshold.

12. The computer program product of claim 8, wherein the anticipated user is any user who may view the new message.

13. The computer program product as in claim 8, wherein the message context summary comprises one or more past messages related to the new message on the application based on the network graph.

14. The computer program product as in claim 8, wherein the message context summary is presented to the anticipated user via a user interface.

15. A system for message context summary generation, the system comprising:

a computer system comprising, a processor, a computer readable storage medium, and program instructions stored on the computer readable storage medium being executable by the processor to cause the computer system to:

collect, by a computing device, application data from an application;

archive, by the computing device, the application data into a datastore;

generate, by the computing device, a network graph based on the archived application data;

detect, by the computing device, a new message posted in the application by an author; the new message containing content on one or more topics;

determine, by the computing device, familiarity of the content of the new message by an anticipated user, wherein familiarity is based on the anticipated user's interaction history with the author over a plurality of channels within the application, and wherein the anticipated user's interaction history includes a time of last viewing one or more relevant messages of the author over the plurality of channels, commenting on the one or more relevant messages of the author over the plurality of channels, and participation metrics between the anticipated user and the one or more relevant messages of the author over the plurality of channels;

associate, by the computing device, the new message with a conjoined message history in the application to establish a context, based on the anticipated user, wherein the conjoined message history may comprise one or more logically ordered messages between various users over the plurality of channels within the application;

generate, by the computing device, a message content summary and context of the new message based on the conjoined message history; and present, by the computing device, the message content summary and context in a sequence of contextual messages, to the anticipated user, wherein the sequence of contextual messages allows the author and the anticipated user to avoid misunderstandings and more fully engage in a discussion within the channel.

16. The system as in claim 15, further comprising program instructions to:

generate, by the computing device, a warning indicating the anticipated user is not familiar with the content of the new message; and present, by the computing device, the warning to the author of the new message.

17. The system as in claim 15, wherein the program instructions to determine, by the computing device, familiarity of an anticipated user with the content of the new message is based on a number of connections in the network graph.

18. The system as in claim 15, wherein the program instructions to generate, by the computing device, a message content summary of the new message based on the message history is in response to determining the familiarity of the anticipated user does not exceed a threshold.

19. The system of claim 15, wherein the anticipated user is any user who may view the new message.

20. The system as in claim 15, wherein the message context summary comprises one or more past messages related to the new message on the application based on the network graph.

* * * * *